United States Patent [19]

Egel

[11] Patent Number: 5,741,069
[45] Date of Patent: Apr. 21, 1998

[54] COMBINED THERMOMETER AND RADIATOR CAP

[76] Inventor: Kenneth D. Egel, 1523 231st St., Letts, Iowa 52754

[21] Appl. No.: 633,069

[22] Filed: Apr. 16, 1996

[51] Int. Cl.⁶ .......................... G01K 1/14; G01K 13/00
[52] U.S. Cl. ............... 374/146; 123/41.15; 220/DIG. 32
[58] Field of Search ........................ 374/146, 150, 374/170; 220/DIG. 32; 123/41.15

[56] References Cited

U.S. PATENT DOCUMENTS

| | | | |
|---|---|---|---|
| 1,181,700 | 5/1916 | Troy | 374/146 |
| 1,610,646 | 12/1926 | Anderson et al. | 374/146 |
| 2,866,338 | 12/1958 | Muncheryan | 374/150 |
| 3,100,391 | 8/1963 | Mansfield | 374/146 |
| 3,255,631 | 6/1966 | Franks | 374/146 |
| 3,567,059 | 3/1971 | Littman | 374/150 |
| 3,622,976 | 11/1971 | Howard | 220/361 |
| 4,079,855 | 3/1978 | Avrea . | |
| 4,196,822 | 4/1980 | Avrea . | |
| 4,865,249 | 9/1989 | Sugano et al. . | |
| 4,930,902 | 6/1990 | Yata et al. | 374/150 |
| 5,052,571 | 10/1991 | Susa et al. | 220/204 |
| 5,081,443 | 1/1992 | Breit | 340/426 |
| 5,186,047 | 2/1993 | Gordon et al. | 374/151 |
| 5,553,941 | 9/1996 | Cope | 374/150 |

FOREIGN PATENT DOCUMENTS

| | | | |
|---|---|---|---|
| 0335018 | 1/1904 | France | 374/146 |
| 0007679 | 3/1914 | United Kingdom | 374/146 |
| 2210863 | 6/1989 | United Kingdom | 220/DIG. 32 |

*Primary Examiner*—Diego F.F. Gutierrez
*Attorney, Agent, or Firm*—Chase & Yakimo

[57] ABSTRACT

A radiator cap for closing the filler neck of a vehicle cooling system includes a numerical display assembly embedded in the top surface of the cap. A temperature probe extends from the bottom surface of the cap and is connected to the display assembly, the assembly being powered by a solar cell battery in the cap. Upon securing the cap to the filler neck the temperature probe senses the temperature of the associated cooling system, this information being delivered to the display assembly for conversion into numerical form. The cap enables a user to ascertain the cooling system temperature at the filler neck site.

7 Claims, 5 Drawing Sheets

COMBINED THERMOMETER AND RADIATOR CAP

BACKGROUND OF THE INVENTION

This invention pertains to a radiator cap, and more particularly, to a cap for instantaneous display of the temperature at the filler neck of the vehicle cooling system.

Various radiator caps have been devised so as to relieve the pressure within the cooling system to allow for safe removal of the radiator cap. A water temperature gauge on the dash of the vehicle for driver viewing is also known. One device, as shown in U.S. Pat. No. 3,255,631, is directed to apparatus which indicates the pressure and temperature within a cooling system during cleaning of the same.

None of these known devices enables a vehicle user to quickly, accurately and efficiently determine the temperature of the cooling system of a vehicle at the filler neck, i.e. coolant fluid inlet thereof. From a safety standpoint, it is important to know the temperature of the cooling system prior to radiator cap removal so as to preclude any escaping steam and/or hot coolant from spraying onto the user upon cap removal. A dash-mounted temperature gauge does not address this desire as it is within the vehicle proper and usually operable only when the vehicle is running. The user prior to removing the radiator cap may not take the time to start the vehicle and wait for the temperature gauge to properly register. Accordingly, it is desirable to have a radiator cap which indicates to the vehicle user the temperature of the cooling system at the fluid inlet thereof and without the need for vehicle start up.

In response thereto I have invented a radiator cap equipped with a depending temperature probe for extension into the cooling system upon cap closure. The cap has a digital read out assembly on the external surface in communication with the probe. The read out assembly is powered by a solar cell as energized upon lifting the vehicle hood. Accordingly, the cap presents a read out of the cooling system temperature. Thus, the user can then decide whether to remove the cap and/or add fluid without vehicle start up depending on the displayed temperature shown.

It is therefore a general object of this invention to provide a radiator cap for display of the cooling system temperature.

It is another object of this invention to provide a radiator cap, as aforesaid, which is battery powered.

A still further object of this invention is to provide a radiator cap, as aforesaid, which gives a temperature read out to a vehicle user upon lifting the hood.

A further object of this invention is to provide a radiator cap, as aforesaid, which continuously monitors the cooling system temperature.

Another further object of this invention is to provide a radiator cap, as aforesaid, which enables the user to safely remove the radiator cap from the cooling system and/or add fluid thereto.

A further particular object of this invention is to provide a radiator cap, as aforesaid, which needs no modification of the cooling system prior to use.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
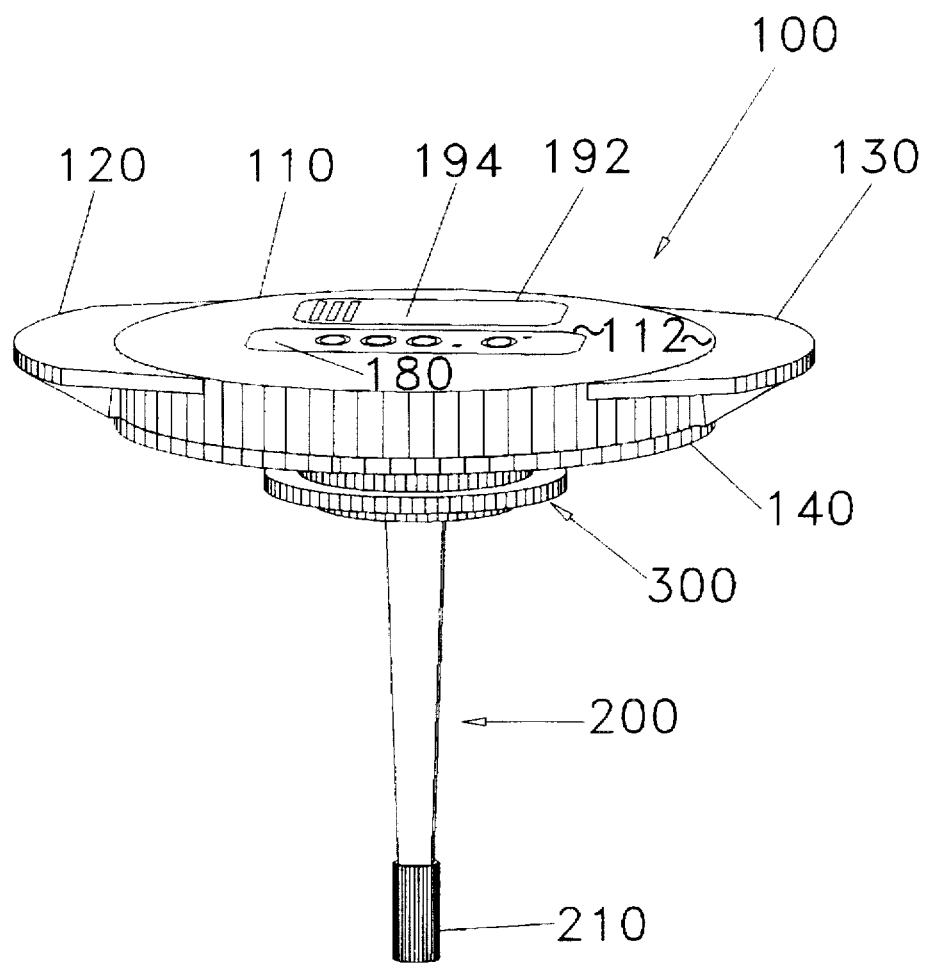
FIG. 1 is a front perspective view of the radiator cap.
Figure 2:
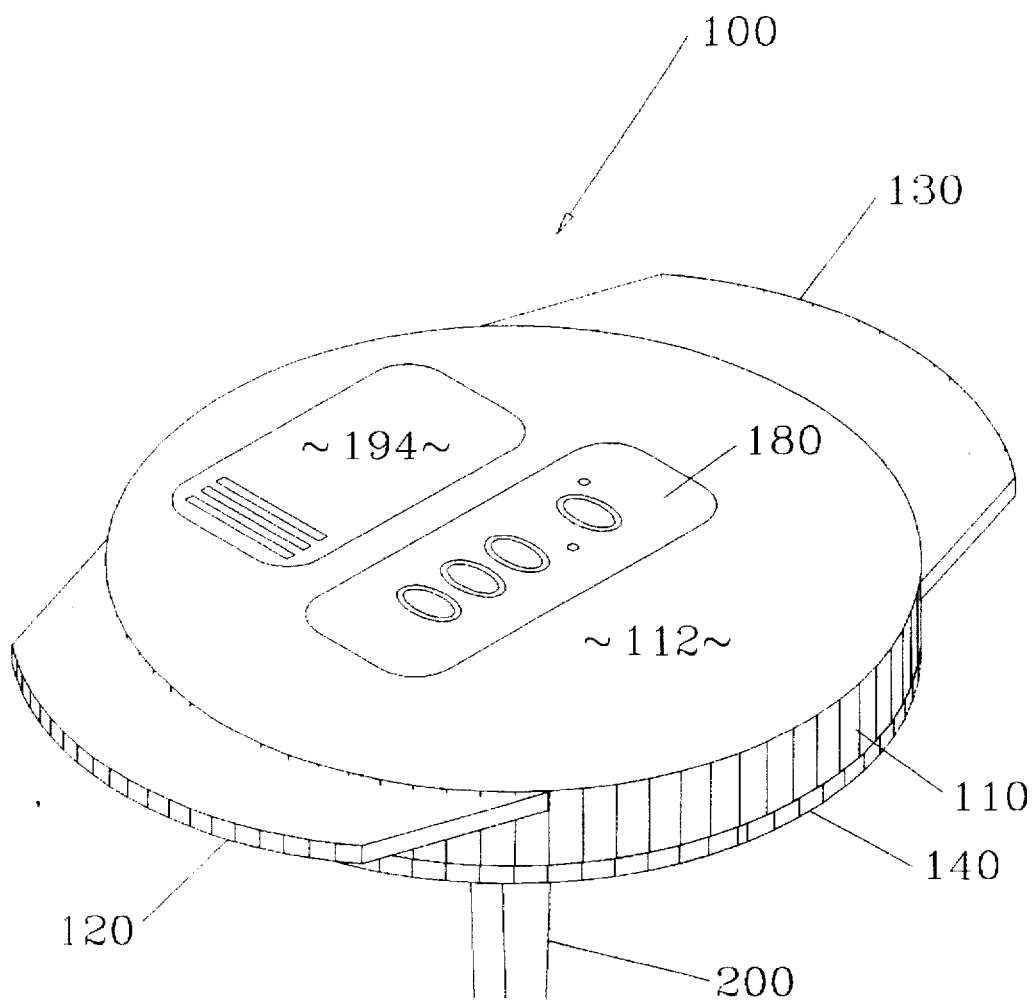
FIG. 2 is a top perspective view of the radiator cap of FIG. 1 on an enlarged scale, the probe being fragmentarily shown.
Figure 3:
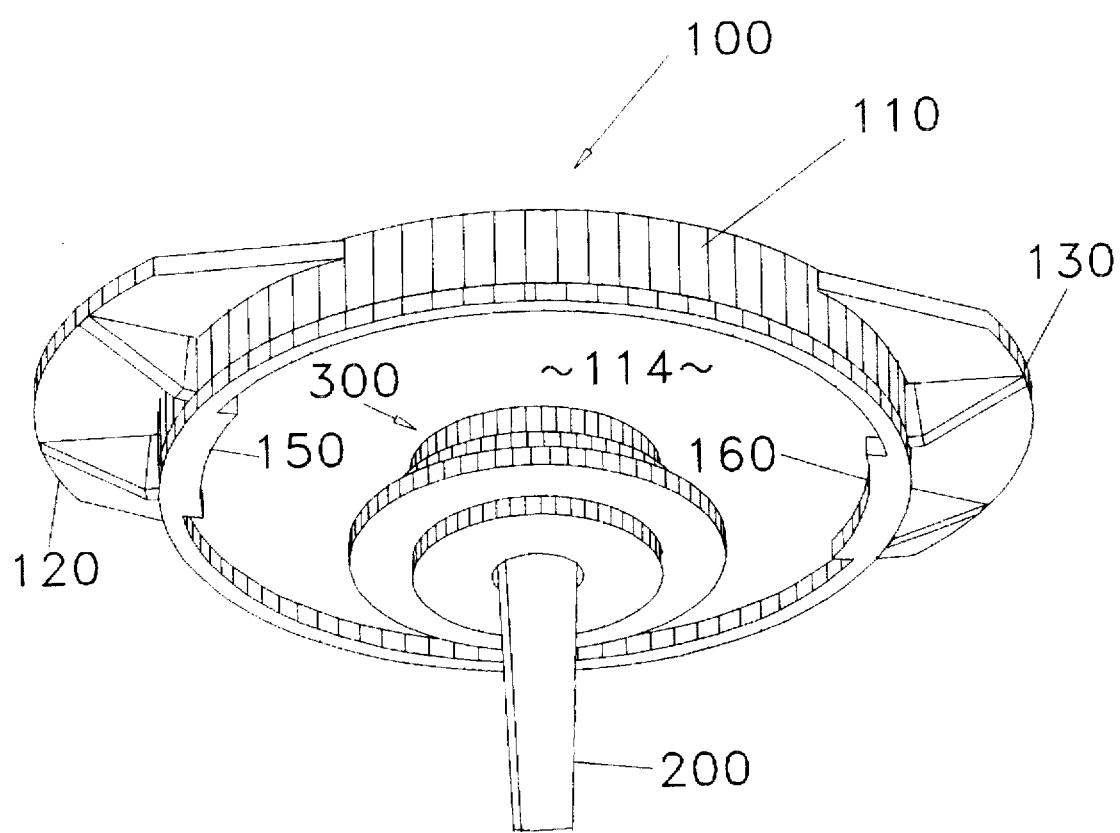
FIG. 3 is a bottom perspective view of the radiator cap of FIG. 2, the probe being fragmentarily shown.
Figure 4:
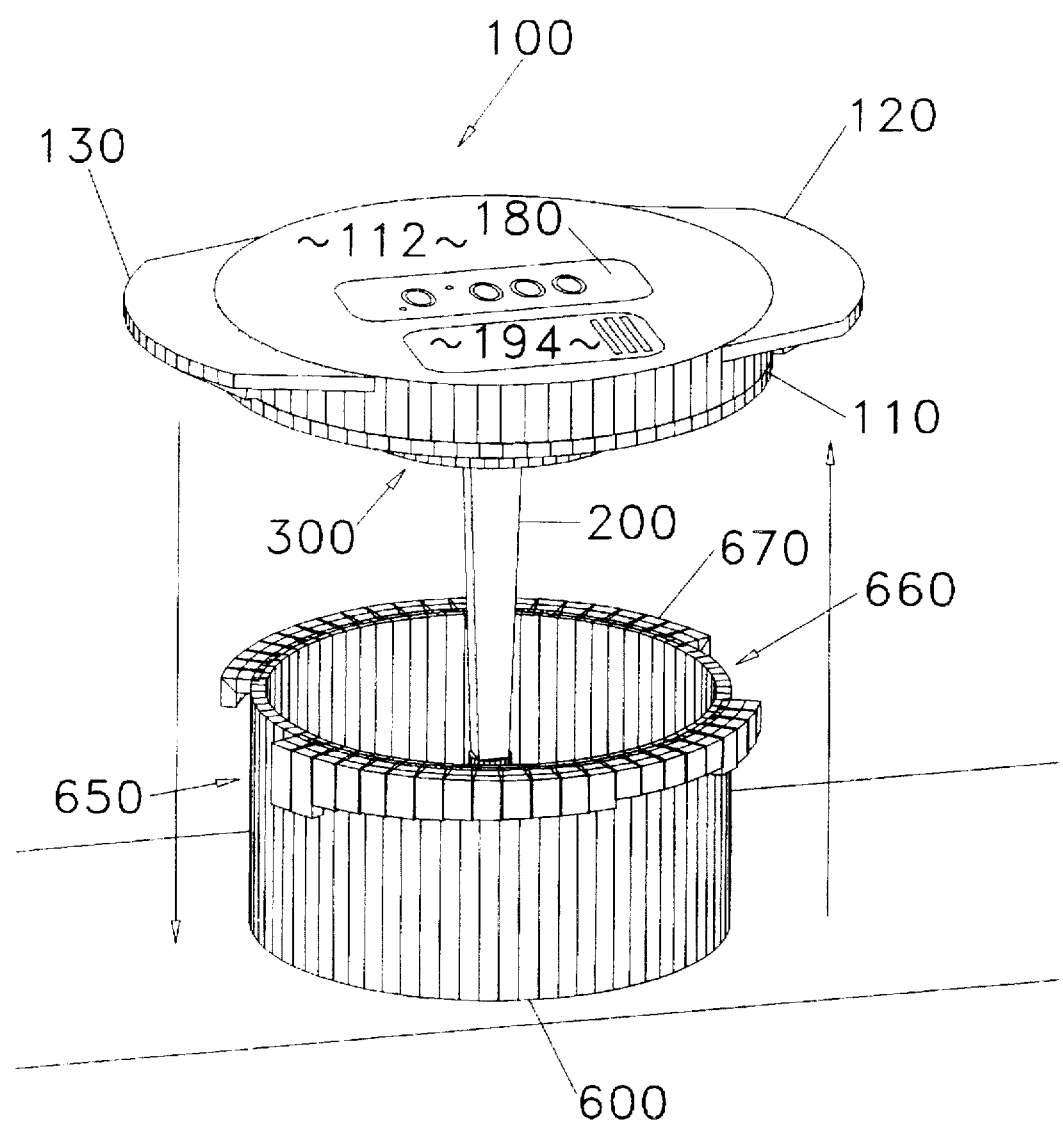
FIG. 4 is a view of the radiator cap as exploded from the filler neck of an associated vehicle cooling system.

Turning more particularly to the drawings, FIGS. 1-5 shows my radiator cap 100. Cap 100 comprises a circular housing 110 having first 120 and second 130 flanges extending therefrom. The bottom of housing 110 presents a free edge 140 with first and second inwardly extending flanges 150, 160.

Figure 5:
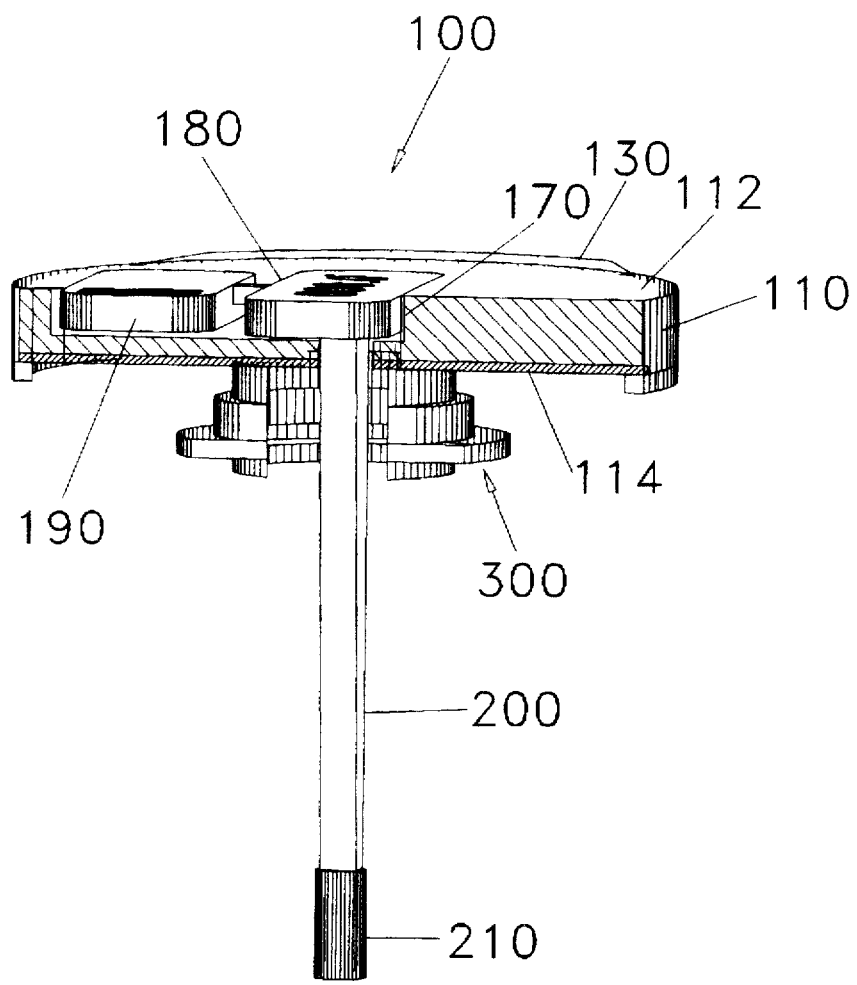
FIG. 5 is a cross sectional view of the radiator cap proper of FIG. 1.

In the top surface 112 of housing 110 is an aperture 170 for receiving therein a digital read out display assembly 180. As shown in FIG. 5 the display assembly 180 further communicates with a DC solar powered battery 190 also nested within an aperture 192 in the cap surface 112, the aperture having a releasable lid 194 thereon. As such, battery 190 energizes the display assembly 180. Connected to the assembly 180 and extending through the bottom 114 of the cap is a temperature probe 200. Probe 200 delivers temperature information to assembly 180, the assembly having means therein for converting this sensed temperature information to numerical form in a manner similar to a human thermometer. Seals 300 surround the juncture of the temperature probe 200 and the bottom surface 114 of the cap 100 so as to prevent fluid leakage at such juncture.

In use the cap 100 is secured to the filler neck 600 of the cooling system by means of the flanges 150, 160 depending through openings 650, 660 found in the flange 670 about the filler neck 600. Upon turning the cap 100 via flanges 120, 130, the flanges 150, 160 are positioned underneath this circular flange 670 so as to secure the cap 100 to the filler neck 600.

At such position the free end 210 of the probe 200 extends through filler neck 600 and into the cooling system for sensing the temperature therein. The sensed temperature information is then delivered to the digital read out assembly 180 which will display this sensed temperature to the viewer upon lifting the vehicle hood. As the hood is normally closed, the solar powered battery, once energized, should have a long life. Thus, the cap 100 provides read out of the cooling system temperature, such temperature being continuously monitored by the temperature probe 200.

In connection with the cap 100, indicia may appear thereon which will advise the user of the displayed temperature at which the cap 100 can be safely removed and/or fluid added to the system. Other safety indicia may also appear thereon.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. In combination with a filler neck of a vehicle's engine cooling system positioned under a normally closed hood of a vehicle, a closure device for the neck comprising:

a cap having upper and lower surfaces for covering an open end of the filler neck;

means for releasably securing said cap to the filler neck;

a temperature sensor assembly in said cap, said assembly including a temperature probe extending from said lower surface of said cap for extension through the filler neck and into the engine cooling system upon said securing of said cap thereto;

a numerical display assembly in communication with said temperature probe and positioned in said upper surface of said cap, said numerical display assembly having means therein for displaying a temperature corresponding to a temperature sensed by said probe; and a light powered source in said cap configured to produce a charge upon an impingement of light thereon, said charged power source coupled to said display assembly for energizing said display means of said numerical display assembly upon the lifting of the vehicle hood to expose said display means said said power source to the impinging light, said cap upper surface displaying the sensed temperature of the engine cooling system upon said securing of said cap to the filler neck and the lifting of the vehicle hood.

2. The combination as claimed in claim 1 wherein said powered source is a DC battery.

3. The combination as claimed in claim 2 wherein said battery is a solar powered cell.

4. The combination as claimed in claim 3 wherein said battery is in said upper surface of said cap.

5. The combination as claimed in claim 1 wherein said device further comprises an aperture in said cap for receiving said power source therein.

6. The combination as claimed in claim 1 wherein said device further comprises at least one seal adjacent said lower surface of said cap and about an interface of said probe with said lower surface of said cap.

7. In combination with a filler neck of a vehicle's engine cooling system positioned under a normally closed hood of a vehicle, a closure device comprising:

a cap having upper and lower surfaces for covering an open end of the filler neck of the engine cooling system;

means for releasably securing said cap to the filler neck;

a temperature sensor assembly including a temperature probe extending from said lower surface of said cap for extension through the filler neck and into the engine cooling system upon said securing of said cap thereto;

a numerical display assembly in communication with said temperature probe and positioned in said upper surface of said cap, said numerical display assembly having means therein for displaying a temperature corresponding to a temperature sensed by said probe upon a displacement of the vehicle hood away from the cooling system; and a light powered solar cell in said cap and connected to said numerical display assembly, said solar cell operating said display means upon light impinging on said cell, said secured cap displaying the sensed temperature of the engine cooling system upon lifting of the hood of the vehicle to expose said solar cell to the impinging light.

\* \* \* \* \*

UNITED STATES PATENT AND TRADEMARK OFFICE
CERTIFICATE OF CORRECTION

PATENT NO.  : 5,741,069
DATED       : April 21, 1998
INVENTOR(S) : Kenneth D. Egel It is certified that error appears in the above-identified patent and that said Letters Patent is hereby corrected as shown below:

Column 3, line 19, delete "said said" and substitute --and said--.

Signed and Sealed this

Thirtieth Day of June, 1998

*Attest:*

BRUCE LEHMAN

*Attesting Officer*          *Commissioner of Patents and Trademarks*